Nov. 14, 1967   R. C. BEITZ   3,352,156
RADIOMETER FOR MEASURING A TEMPERATURE OF
SEMI-TRANSPARENT MATERIAL
Filed Feb. 12, 1965

INVENTOR.
RICHARD C. BEITZ
BY
ATTORNEY

United States Patent Office 3,352,156
Patented Nov. 14, 1967

3,352,156
RADIOMETER FOR MEASURING A TEMPERATURE OF SEMI-TRANSPARENT MATERIAL
Richard C. Beitz, New Canaan, Conn., assignor to Barnes Engineering Company, Stamford, Conn., a corporation of Delaware
Filed Feb. 12, 1965, Ser. No. 432,096
4 Claims. (Cl. 73—355)

ABSTRACT OF THE DISCLOSURE

A radiometer for the measurement of temperature or thickness of semi-transparent substances having absorption bands in a particular radiation range and particularly in the infrared, having a non-selective detector responding to the range of radiations involved, a mask and chopper closely adjacent to each other to be substantially in one plane, on which plane the entrance aperture of the radiometer is imaged, the chopper having blades of the semi-transparent material being tested, the radiation passing through mask and chopper being focused onto the radiation detector, and an A.C. amplifier connected to the output of the detector.

---

Radiometers, and particularly infrared radiometers, have been used for many years to measure the temperature of various objects at a distance by producing an output which is a function of the infrared radiation received from the object, the temperature of which is to be measured. Two problems arise. One is presented by the fact that the target, the temperature of which is to be measured, may be small so that the radiometer will see background as well as target in its field of view. This problem is encountered not only with semi-transparent materials, such as plastics, but also with targets which behave more or less as black bodies. A number of methods have been proposed and effectively used for distinguishing a small target from a larger background, either uniform or nonuniform, but the methods are not effective for temperature measurement of materials which transmit considerable bands in the infrared.

The second problem is presented by the fact that semi-transparent materials such as plastics do not behave as black bodies because they absorb only in certain portions of the infrared spectrum and, therefore, emit only in such portions.

There are a large number of materials which are semi-transparent, particularly in the infrared. One of the most common is polyglycol terephthalate, which is sold under the trademark "Mylar." This abbreviated name will be used in the specification. Other plastics such as polyethylene, polypropylene, nylon, polyvinylidene chloride, cellophane, cellulose esters such as cellulose acetate and the like are also typical examples. Mylar has a spectrum with a large number of absorption maxima between $2\mu$ and $16\mu$. Some of these absorption bands are fairly wide. Polyethylene has only a few very narrow absorption bands.

Summary of the invention

Essentially in the present invention a reticle is used with alternate blades of opaque material with openings, adjustable if desired, of definite size and blades made of thin pieces of the material the temperature of which is to be measured. The opening in the opaque blades, which may be effected by a suitable adjustable mask, is so chosen that it presents a cross-section of only part of the image of the entrance aperture of the radiometer in the plane of the reticle. This proportion corresponds to the general overall transmission through the plastic blades. For example, in the case of 1 mil Mylar the transmission is approximately 50 percent between $2\mu$ and $16\mu$ and, therefore, the mask and opaque blades are so proportioned that they let through one-half of the cross-section of the entrance aperture. As a result the background, behaving as a black body or a gray body, does not have its radiation chopped at all because the proportion going through the opening in the mask when opaque blades are encountered lets through the same radiation as passes through the whole of the aperture cross-section when the plastic blades are interposed. The radiometer uses a non-selective detector such as a thermistor bolometer or thermopile which responds uniformly through the range of infrared selected for the measurement. In the case of Mylar the nature of its absorption spectrum is such that it is advantageous to use a broad band in the infrared, for example, from $2\mu$ to $16\mu$ which has the advantage of providing a reasonable amount of energy. In the case of some other material such as polyethylene filters may be used passing radiation in a narrower band including one of the sharp absorption bands. In every case a suitable range of radiations will be chosen depending on the nature of the material and the temperature of which is to be measured.

The use of filters, which do not need to be excessively sharp cutting, permits operation under certain conditions where otherwise the accuracy of the instrument would be reduced. One such situation is represented by materials, such as polyethylene, where there are only a few absorption bands. The result is that the discrimination by the instrument is between two rather intense radiations and hence suffers from the difficulty of measuring accurately small differences between large quantities. Another condition is presented where the background is at a much higher temperature than the material which is to be measured. In such cases the radiation from the background may be so high that the accuracy of discrimination between background and target becomes insufficient for reliable temperature measurement. In such cases simple filters are used which pass a narrower wavelength band including one or more absorption bands of the material but, of course, the band is wider than any single band. This does not reduce significantly the signal from the material to be measured but greatly reduces the intensity of the background.

Referring again to the typical example of Mylar a uniformly black or gray background is not chopped at all because the same amount of radiation passes regardless of whether an opaque blade of the chopper with suitable restricted opening is encountered by the radiometer beam or whether a larger cross-section passes through the blades of Mylar. On the other hand, if there is an object made of Mylar in the field of view of the radiometer radiation from it will be chopped because it emits only at the points where it absorbs and to the same extent. Thus, the radiation from the Mylar object is chopped because the Mylar blades absorb in exactly the infrared range where the object emits. Looking at it another way chopping is effected by having blades which are of the same material and, therefore, have absorption bands that match the emission bands of the material in question. The instrument, therefore, operates by producing a spectographic null for background objects.

Reference has been made to the fact that while a radiometer receiving only infrared radiation is preferred the invention is not limited to it. In theory any radiation can be used in which the material to be measured has sharp absorption bands. However, the use of visible radiation, and to a lesser extent very short wave infrared radiation, produces complications because the intense illumination in the visible light by the sun or other illuminants can seriously degrade accuracy because then the material not only emits by reason of its own temperature but also reflects the short wave radiation and this latter can introduce a spurious signal. Of course, if all ambient short wave radiation is eliminated, that is to say measurements are taken in substantial darkness, the same degree of accuracy is obtained with a shorter wave radiation. However, this imposes quite a limitation on the use of the instrument and for this reason the modification using radiation in the infrared is preferred.

Description of the preferred embodiments

Figure 1:
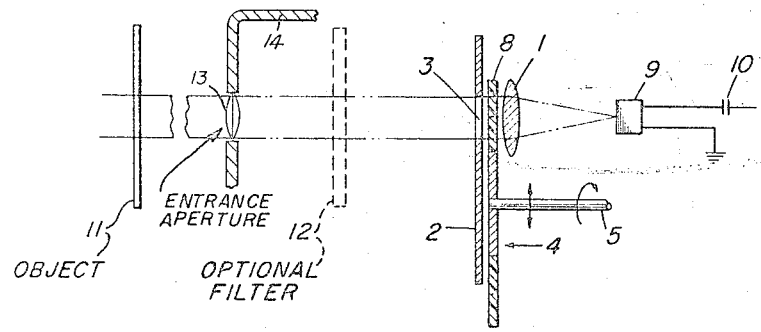
FIG. 1 is a rough diagrammatic representation of the optical path in a radiometer.

FIG. 1 shows, in extremely simplified diagrammatic form, a radiometer of the present invention. An object, the temperature of which is to be measured, is shown as a piece of "Mylar" at 11. A portion of the radiometer housing 14 is shown with an opening 13 constituting the entrance aperture of the instrument. A mask 2 is provided with an aperture 3. Behind the mask there is a rotating chopper 4, turned by a shaft 5 connected to conventional driving means (not shown). The chopper, as will be seen in FIGS. 2 and 3, consists of a central portion with projections 7 of opaque material. In between these projections are inserts 8 forming blades of the material the temperature of which is to be measured, in this typical example, Mylar.

Figure 2:
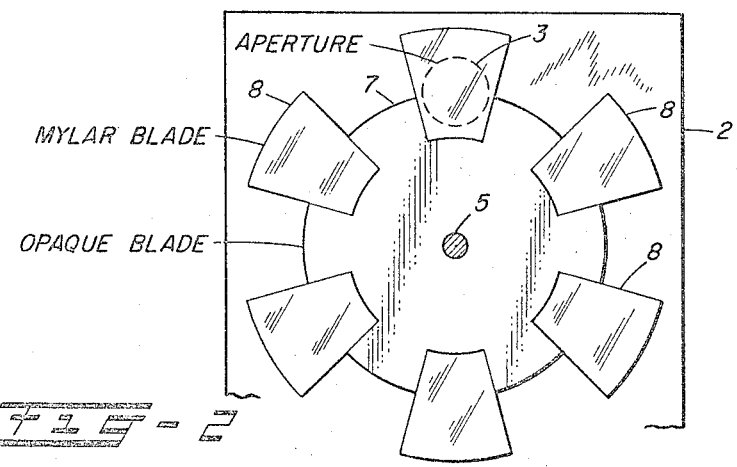
FIG. 2 is an elevation of the chopper with a semi-transparent blade in the radiometer beam.
Figure 3:
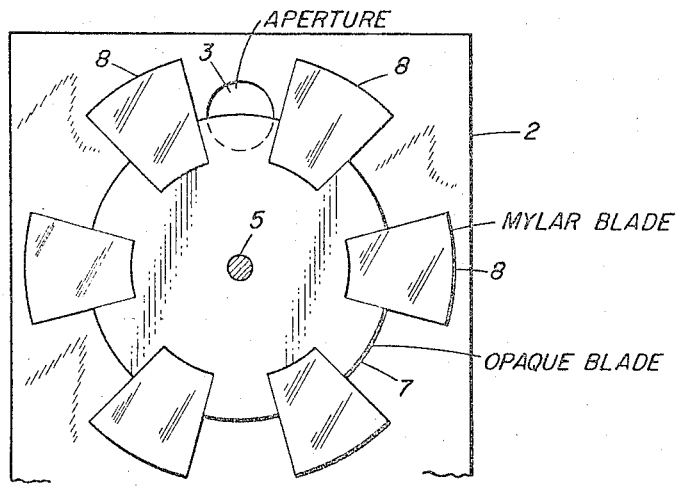
FIG. 3 is a similar elevation of the chopper with an opaque blade in the radiometer beam.

It will be seen that in FIG. 2 the opening in the mask on which the entrance aperture of the instrument is imaged is wholly contained in a Mylar blade. Therefore, when such a blade is in the beam of the radiometer the whole cross-section is received. In FIG. 3 it is shown that the opening 3 is partly obscured by the projection 7 of opaque material. In the example given the cross-section is half the entrance aperture image because the transmission of Mylar from $2\mu$ to $16\mu$ is approximately one-half. Radiation passing through the chopper is focused by a lens 1 onto a detector 9 which may be a thermistor bolometer or a thermopile. The placement of the detector is such that the target is imaged on the plane of the detector.

When the instrument operates, a uniform background is not chopped, hence there is no AC signal from the detector 9 and the conventional AC amplifier (not shown) is blind to unchopped radiation. This is symbolized by showing a capacitor 10 in the output of the detector 9. In conventional AC amplifiers this capacitor, of course, is part of the amplifier itself. Now if there is an object of Mylar in the field of view of the radiometer radiations from it will be chopped because half of the radiations pass through in the chopper position of FIG. 3 but in the chopper position of FIG. 2 the Mylar blade completely absorbs radiation from a Mylar target. As a result there will be an AC signal produced from the detector 9 only by reason of radiation from the Mylar detector and the radiometer can be suitably calibrated, if desired, so that the instrument output meter reads in temperature.

It will be noted that the proportion of the aperture obscured by the opaque projections 7 depends on the particular material for which the instrument is to be used. If the temperature of another material, for example, polyethylene is to be measured a different chopper can be substituted with polyethylene blades 8 and with projections 7 covering a different proportion of the aperture image. With polyethylene which does not have many wide absorption bands radiation from a black body will pass through more readily. In other words, there will be less than 50 percent absorption. Correspondingly, therefore, the blade 7 will not project as far as in the drawings so that the net aperture opening will correspond to the transmission of the polyethylene. Because of the more extended transmission of polyethylene, somewhat improved accuracy can be obtained by introducing a filter 12 which is shown in dashed lines in FIG. 1.

It will be seen that in order to operate the present invention requires some means for providing an opening of predetermined size when an opaque blade is in the beam. The method of varying this by using interchangeable choppers, which is illustrated in the drawings, is only one of many reasons which can be used. The same effect can be achieved by moving the mask or the chopper in their planes. This in indicated by a double arrow in FIG. 1 and can be by means of a micrometric screw or any other conventional adjusting means which permits precision. Now if the radiometer is to measure other substances suitable inserts 8 of the substance can replace the Mylar and the instrument can be calibrated against a uniform background by moving the axis of the chopper until the background radiation is not chopped. Any other mechanism by which the cross-section of the beam is varied when the opaque blades are in the beam may be used. The invention while requiring a definite cross-sectional relation to the semi-transparent material to be measured is not concerned with any particular mechanism for producing such an effect. Two simple ways of doing it have been described above and are merely to be considered as illustrative examples.

In FIG. 1 no lens is used as a collecting means. This, however, is only a typical diagrammatic representation and catoptric or catadioptric collecting optics may be used as in various standard radiometers. As pointed out above this portion of the instrument is not changed by the present invention. It is also possible for mask and chopper to be interchanged. All that is required is that the two be sufficiently close together so that the entrance aperture can be imaged on both of them.

The instrument has been described in connection with the measurement of temperature of a semi-transparent material. This is the most important single field of utility. However, if the temperature of the semi-transparent material is known, it is possible to use the instrument of the present invention to measure the thickness of the material because the amount of absorption and hence radiation follows an exponential expression similar to that of Beers law for absorption of radiation. If the temperature is known then the amount of radiation is a function of the thickness of the material. By suitable calibration the instrument of the present invention can then read thickness. It should be noted that when thickness measurements are being made there are very definite limits on how thick the material may be because the thickness enters in as a negative exponent of $e$. After the thickness reaches a certain value, depending on the material, then radiation from the molecules which has to pass through a considerable layer of the material becomes absorbed and so beyond a certain thickness additional molecules do not increase the absorption and hence there can be no greater radiation. These limits, while theoretically real, fortunately do not interfere significantly with most thickness measurements because for thicknesses well below 10 mils the equilibrium thickness is not reached and most semi-transparent materials in sheet form are from a fraction of a mil to 2 or 3 mils. In such cases the prevent invention, with suitable calibration, operates effectively as a thickness gage when the temperature of the semi-transparent material is known. This opens up another field of continuous thickness measurement of a moving sheet which is of practical importance in the manufacture of many plastic sheets. When the instrument is to be used as a thickness gage the blades must either be sufficiently thick so that they have reached practically 100% absorption in the bands or, if thinner blades are to be used, it is essential that they be of quite uniform thickness. The exact blade thickness is not important so long as it is uniform as it is taken into consideration when the instrument is calibrated.

I claim:

1. In a radiometer for the measurement of temperature or thickness of semi-transparent substances having absorption bands in a predetermined radiation range, in which there is provided with an entrance aperture, a spectrally nonselective radiation detector and AC processing circuits therefor, the improvement which comprises
   (a) a mask having an opening and chopper located closely adjacent to the mask and positioned so that the entrance aperture of the radiometer is imaged on the mask opening and on the plane of the chopper,
   (b) the chopper comprising alternate blades of opaque material and material corresponding to that the temperature or thickness of which is to be measured, and
   (c) the opaque blades projecting only so far into the beam through the mask opening that transmission of black body radiation through the restricted opening when the opaque blades are in the beam is equal to the transmission through the blades of the semi-transparent material, whereby radiation from objects of the semi-transparent material is chopped but uniform background is not chopped and so does not produce an AC signal from the detector.

2. A radiometer according to claim 1 provided with means for restricting radiation into the radiometer to a predetermined band in the infrared, said band including at least one strong absorption band in the semi-transparent material, the temperature of which is to be measured.

3. An instrument according to claim 2 in which the semi-transparent material forming alternate bands in the chopper is polyglycol terephthalate.

4. An instrument according to claim 2 in which the semi-transparent material forming alternate bands in the chopper is polyethylene.

References Cited

UNITED STATES PATENTS 2,356,238   8/1944   Gillett et al. _____ 250—226 X
2,909,924  10/1959   Flook et al. _____ 73—355

OTHER REFERENCES

Rose et al., The Condensed Chemical Dictionary, 6th edition, Rheingold, page 771, copyright 1961.

LOUIS R. PRINCE, *Primary Examiner.*

F. SHOON, *Assistant Examiner.*